(12) United States Patent
Popp

(10) Patent No.: US 6,409,096 B2
(45) Date of Patent: Jun. 25, 2002

(54) HYDRAULICALLY ACTUATED FUEL INJECTOR CARTRIDGE AND SYSTEM FOR HIGH PRESSURE GASEOUS FUEL INJECTION

(75) Inventor: Roger Popp, Woodland Park, CO (US)

(73) Assignee: Woodward Governor Company

(*) Notice: Subject to any disclaimer, the term of this patent is extended or adjusted under 35 U.S.C. 154(b) by 0 days.

(21) Appl. No.: 09/883,023

(22) Filed: Jun. 15, 2001

Related U.S. Application Data

(62) Division of application No. 09/482,481, filed on Jan. 12, 2000, now Pat. No. 6,270,024.

(51) Int. Cl.$^7$ ................................................ B05B 9/00
(52) U.S. Cl. ........................................ 239/124; 239/584
(58) Field of Search ............................. 239/124, 533.2, 239/533.3, 533.7, 533.9, 533.11, 533.12, 584, 585.1, 585.2, 93, 95

(56) References Cited

U.S. PATENT DOCUMENTS

| | | | |
|---|---|---|---|
| 4,157,012 A | 6/1979 | Dubell | 60/39.46 |
| 4,365,756 A | 12/1982 | Fisher | 239/533.2 |
| 4,421,280 A | 12/1983 | Lewis et al. | 239/585 |
| 4,463,901 A | * 8/1984 | Perr et al. | 239/95 |
| 4,503,826 A | 3/1985 | Kessler et al. | 123/470 |
| 4,687,136 A | 8/1987 | Ozu et al. | 239/8 X |
| 4,948,049 A | 8/1990 | Brisbon et al. | 239/91 |
| 4,987,878 A | 1/1991 | Johnson | 123/531 |
| 5,106,023 A | 4/1992 | Bentley et al. | 239/533.2 |
| 5,242,117 A | 9/1993 | D'Agostino et al. | 239/533.2 |
| 5,285,756 A | 2/1994 | Squires | 123/294 |
| 5,315,973 A | 5/1994 | Hill et al. | 123/304 |
| 5,398,657 A | 3/1995 | Press et al. | 123/472 |
| 5,505,384 A | 4/1996 | Camplin | 239/533.5 |
| 5,522,545 A | 6/1996 | Camplin et al. | 239/92 |
| 5,626,327 A | 5/1997 | Clark | 251/129.15 |
| 5,632,444 A | 5/1997 | Camplin et al. | 239/88 |
| 5,752,481 A | 5/1998 | Faulkner | 123/294 |
| 5,826,801 A | 10/1998 | Kobayashi et al. | 239/533.4 |
| 5,894,992 A | 4/1999 | Liu et al. | 239/91 |
| 5,904,300 A | 5/1999 | Augustin | 239/533.8 |
| 6,073,862 A | * 6/2000 | Touchette et al. | 239/96 |

OTHER PUBLICATIONS

Relative Performance of High–Pressure Fuel Gas Delivery on Large–Bore, Two–Stroke Natural Gas Engines by Willson, et al.—13 pages.

* cited by examiner

Primary Examiner—William C. Doerrler
Assistant Examiner—Christopher Kim
(74) Attorney, Agent, or Firm—Leydig, Voit & Mayer, Ltd.

(57) ABSTRACT

A high pressure gaseous fuel injector for injecting natural gas or other gaseous fuels at high pressures (eg. 300 to 700 psig more or less) into combustion engines for improved efficiency, better performance and reduced environmental emissions. The fuel injector is powered by hydraulic signals from an electrohydraulic valve. The fuel injector includes an outer cartridge housing and a universal valve cartridge mounted therein. An unsealed small clearance between the actuating piston and its bore in the cartridge allows controlled leakage of oil. The leakage of oil lubricates metal to metal contact between the upper guide and the valve and lubricates the dynamic gas seal. Gaseous fuel leakage into the leaked oil is tolerated and any combined oil/gaseous fuel is removed to an external location for separation.

20 Claims, 9 Drawing Sheets

HYDRAULICALLY ACTUATED FUEL INJECTOR CARTRIDGE AND SYSTEM FOR HIGH PRESSURE GASEOUS FUEL INJECTION

CROSS-REFERENCE TO RELATED PATENT APPLICATIONS

This patent application is a divisional of U.S. patent application Ser. No. 09/482,481, filed Jan. 12, 2000, issued as U.S. Pat. No. 6,270,024 on Aug. 7, 2001.

FIELD OF THE INVENTION

The present invention generally relates to fuel injectors, and more particularly high pressure gaseous fuel injectors for internal combustion engines.

BACKGROUND OF THE INVENTION

The natural gas transmission industry and chemical process industries use a large number of large-bore, 2-stroke and 4-stroke natural gas engines for compressing natural gas. For example, industries use these engines for such purposes as maintaining pressure in the extensive network of natural gas pipelines that supply residential housing and commercial businesses. The network of natural gas pipelines typically operate at high pressures in the neighborhood of between 500 psig and 1000 psig.

These large-bore, natural gas engines may be powered by a small portion of the natural gas passing through the pipelines. However, before being injected into the engine, the pressure of the gas is significantly and substantially reduced. Gaseous fuel is typically injected into these cylinders at low pressures (for example, 15 psig to 60 psig by mechanically actuated fuel injectors, such as that disclosed in Fisher, U.S. Pat. No. 4,365,756. The problem with low pressure injection is that the fuel pressure provides little kinetic energy with which to induce cylinder charge mixing. There is ample evidence that the fuel and air in these large bore engines are not well mixed and as such exhibit poor combustion stability, high misfire rates and significant cycle-to-cycle variations in peak pressure. As a result, these engines are not efficient and also are environmentally detrimental, contributing to approximately 10% of the total $NO_x$ production in the United States from stationary combustion sources according to estimates.

The concept of using high pressure fuel delivery to enhance fuel mixing in these engines has been proposed as a means to improve efficiency and environmental emissions from these engines. However, retrofitting existing engines provides a significant hurdle because these engines are manufactured by different companies and also vary in size. Moreover, injecting fuel at high pressure as opposed to low pressure requires the fuel injectors to operate under extremely high operating pressures which in turn greatly increases stresses and powering requirements for opening and closing the valves. A key requirement for any proposed high pressure fuel injector is reliability. These large-bore, natural gas engines typically run continuously over long time periods, meaning that any suitable fuel injector must be capable of reliably enduring very long operating cycles of the engine. It is desirable for example, that the fuel injectors reliably operate over several hundred million continuous cycles of the engine (about one to two years before replacement). As such, a valve must achieve reliability over this long time period or operating interval. Fuel injectors of the prior art such as that disclosed in Fisher, U.S. Pat. No. 4,365,756 are not capable of reliably sealing and accurately controlling the injection of gas at high pressure. Only recently have economic and environmental pressures on the gas industry resulted in justification for advances in fuel injection technology. For at least the foregoing reasons, commercial large bore 2-stroke and 4-stroke natural gas engines continue to be fueled at low pressure by conventional low pressure fuel injectors.

BRIEF SUMMARY OF THE INVENTION

It is the general aim of the present invention to provide a commercially reliable and practical fuel injector for injecting high pressure gaseous fuel (eg. around 300–700 psi or more) into combustion engines.

It is an object of the present invention according to one aspect to provide a fuel injector that can withstand the forces of high pressure gaseous fuel and has a long service operation but does not leak either gaseous fuel or hydraulic fluid to the external environment.

It is another object of the present invention according to another aspect to provide a fuel injector that is universal in that the fuel injector assembly can be easily adapted without any or any substantial redesign to fit and operate as desired on the various types and sizes of combustion engines in industry.

It is a another object of the present invention according to another aspect to provide a highly reliable fuel injector, and specifically one that is not susceptible to thermal damage from the engine.

It is another object to provide a fuel injector with increased operating life, whereby gas leakage, eventually expected from o-rings and sliding gas seals, is captured and safely and properly disposed of, on an ongoing basis, not requiring engine shut-down to replace the injector valve.

In accordance with these and other aims and objectives, the present invention is directed towards a novel fuel injector cartridge, a novel fuel injector that includes a tubular cartridge housing and the fuel injector cartridge inserted therein, and an electrohydraulic fuel injector assembly incorporating the fuel injector and an electrohydraulic valve, all for facilitating the injection of high pressure gaseous fuel. According to the present invention, the fuel injector is operated by hydraulic oil to successively open and close to inject gas into the cylinders of the engine in sequence with the engine cycles. The invention includes at least one oil collection chamber for collecting leakage of hydraulic oil and/or any gas for safe removal.

According to the preferred embodiment, two interconnected chambers are provided. One chamber collects oil leakage past the piston and gas leakage past the gas valve. The second chamber collects any other leakage between the electrohydraulic valve and the fuel injector. Gas seal leakage is not anticipated for new fuel injectors and their cartridges, but it will be appreciated that over the course of several hundred million operating cycles, wear of gas seals can occur, and particularly, the gas valve seal engaging the moving valve, and as such, gas leakage can occur. The collected oil and/or gas is directed through a separate outlet port away from the entire assembly to a remote gas and oil separator to remove gas from the oil and recycle the oil. A small clearance may be provided between the piston and the piston chamber or bore in which it reciprocates to regulate and limit the amount of leakage and thereby provide a controlled amount of leakage.

Several advantages may result from the availability of leaked oil in the fuel injector assembly. One advantage is that the leaked oil can be used to lubricate the contact surfaces between an upper guide and the valve. This allows for a precision hardened steel upper guide without wear concerns that provides accurate guiding of the gas valve, prolonging the life of the gas valve seat and sliding dynamic gas valve seal. Another advantage is that the collection chambers and associated passages provide a low pressure buffer between the high pressure gaseous fuel and high pressure hydraulic operating fluid, as well as between these high pressure locations inside the fuel injector and the external atmosphere.

In the preferred embodiment, two collection chambers are provided, one between the electrohydraulic valve and the fuel injector cartridge, and one between the valve and piston inside of the cartridge. The novel fuel injector cartridge of the present invention may be replaced periodically, typically more frequent than other components of the system. The structure of the preferred embodiment provides a cost effective means for periodically replacing the fuel injector cartridge.

Other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
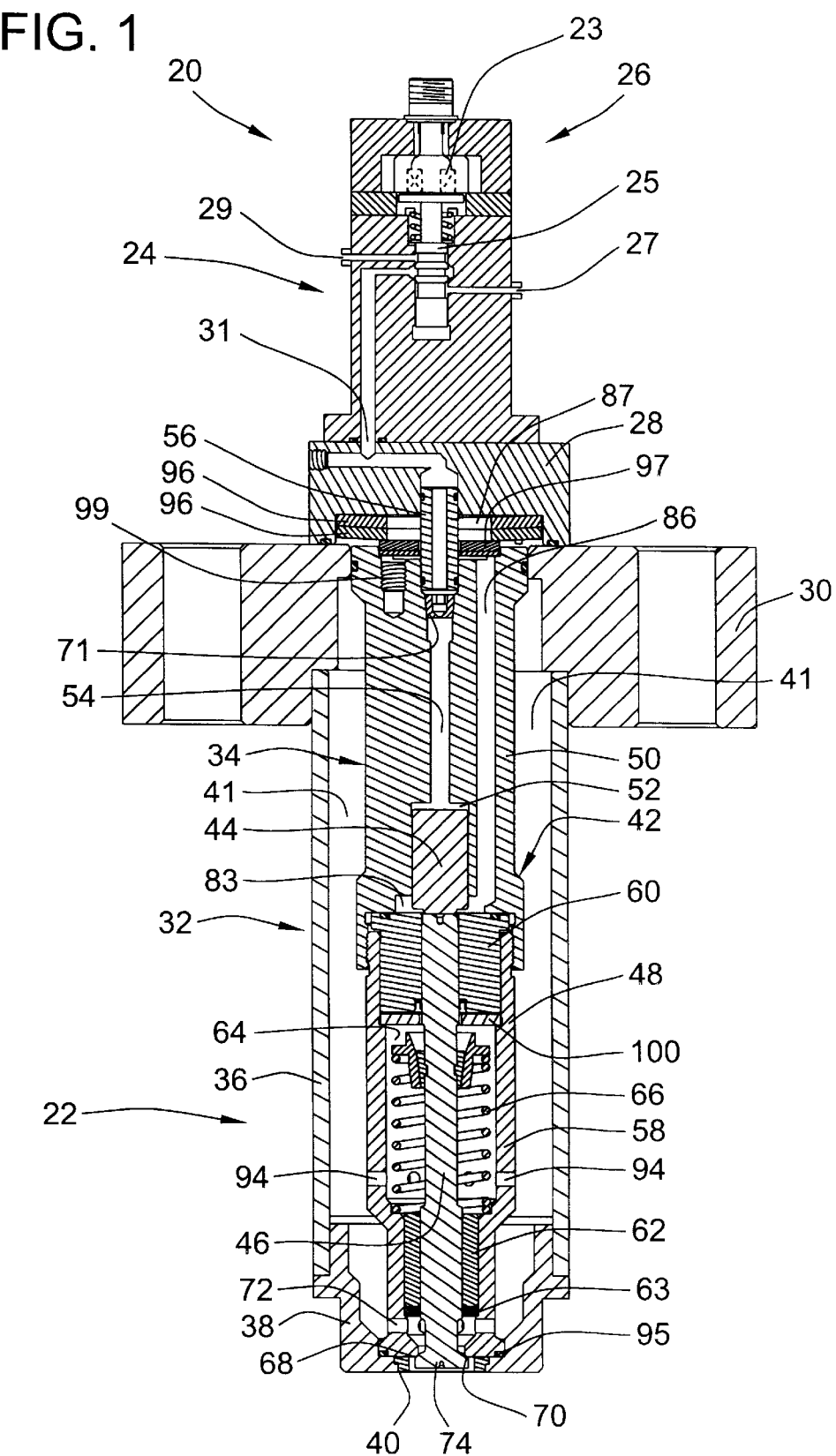
FIG. 1 is a cross-sectional view of a high pressure fuel injector assembly in accordance with a preferred embodiment of the present invention, illustrated in a closed position.
Figure 7:
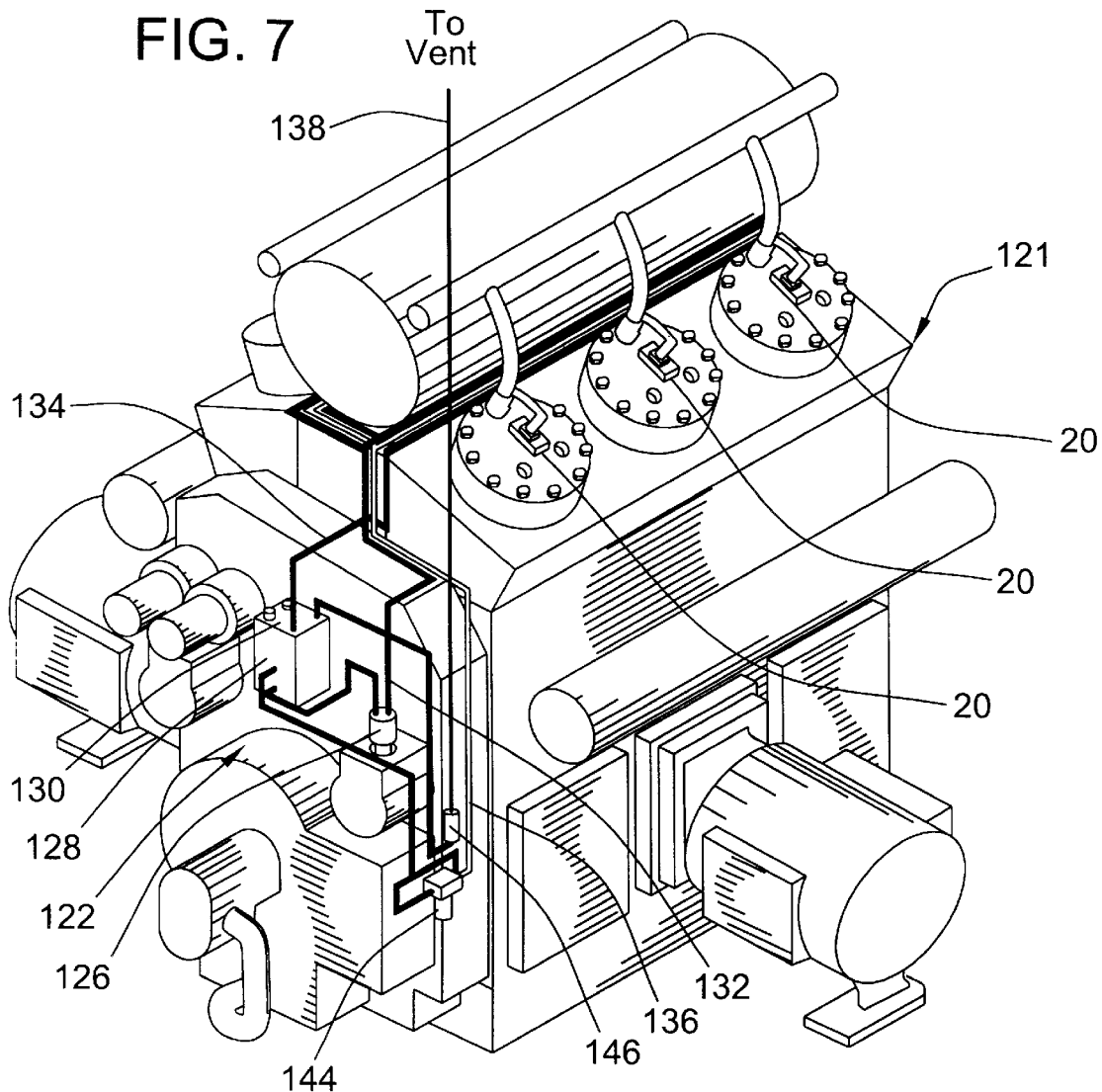
FIG. 7 is a perspective and partly schematic illustration of multiple high pressure fuel injector assemblies in an engine system environment and mounted to an engine.
Figure 8:
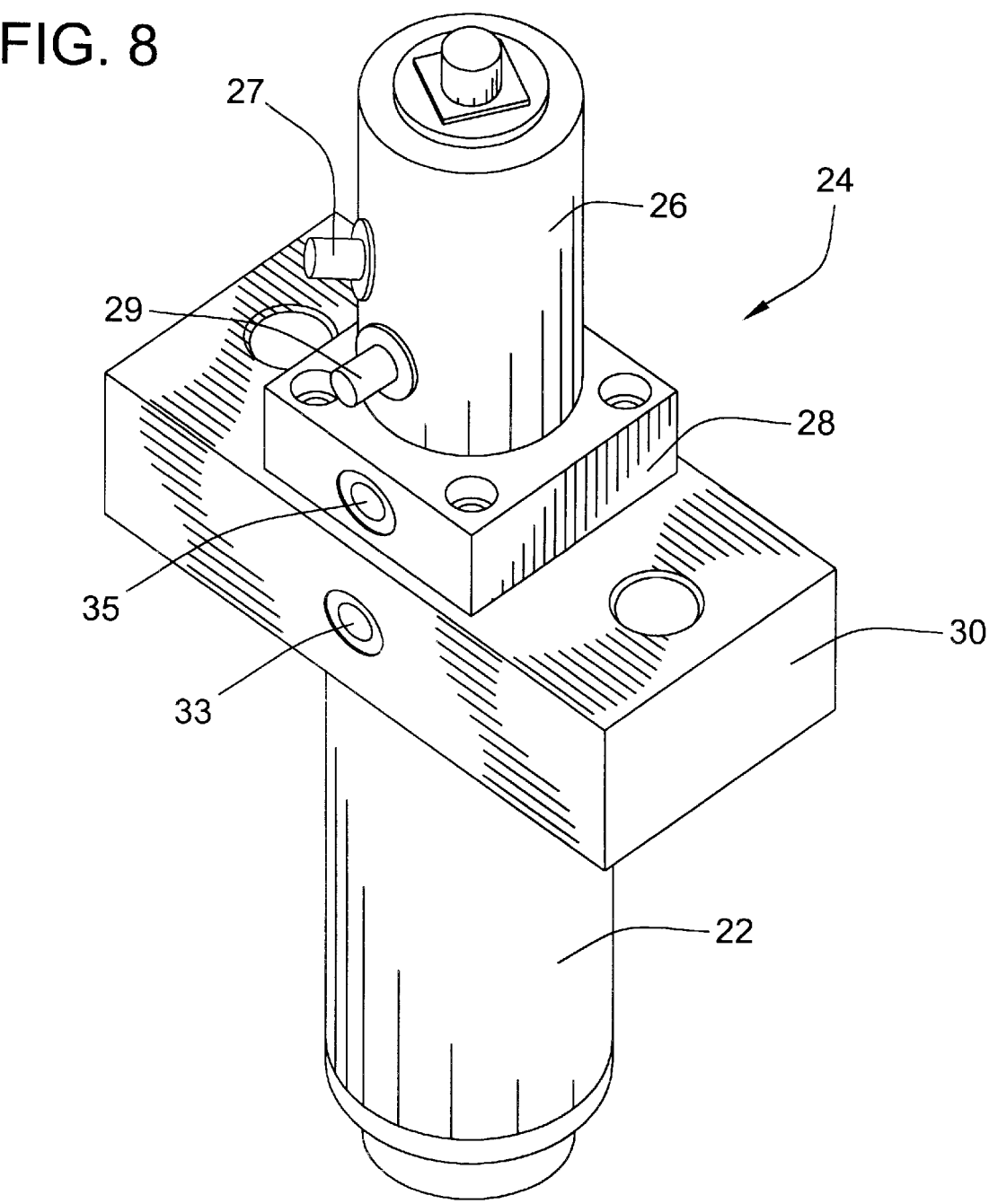
FIG. 8 is a perspective view of the high pressure fuel injector assembly of FIG. 1.
Figure 9:
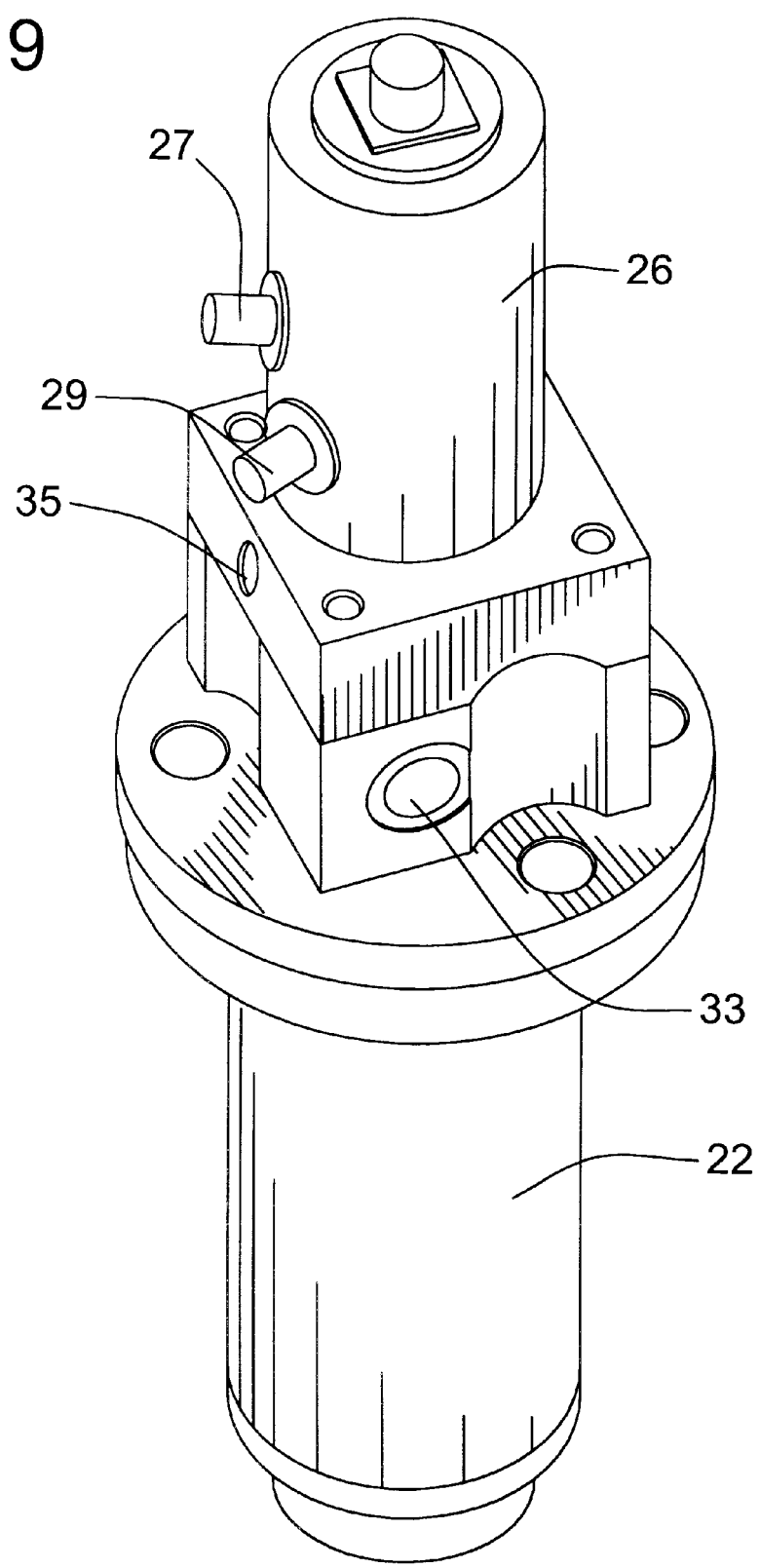
FIG. 9 is a perspective view of the high pressure fuel injector assembly of FIG. 1, but with a different embodiment of the fuel injector housing.

Referring to the cross section of FIG. 1, the present invention is embodied in a high pressure fuel injector assembly 20. The high pressure fuel injector assembly 20 generally comprises a fuel injector 22 and an electrohydraulic valve assembly 24. In general, the electrohydraulic valve assembly 24 hydraulically operates the fuel injector 22 to successively inject gaseous fuel such as natural gas into the cylinders of an engine 121. A partly schematic illustration of an engine 121 with multiple fuel injector assemblies 20 is illustrated in FIG. 7. The disclosed fuel injector assembly 20 provides a commercially reliable and practical fuel injector for injecting high pressure gaseous fuel (eg. around 300–700 psig, but also including greater and lesser pressure) into combustion engines, thereby improving the efficiency of the engine and reducing the environmental emissions therefrom. Detail below will first be given to the structure and function of the high pressure fuel injector assembly 20 as shown in FIG. 1 and then to an exemplary engine operating environment for the assembly 20.

Figure 5:
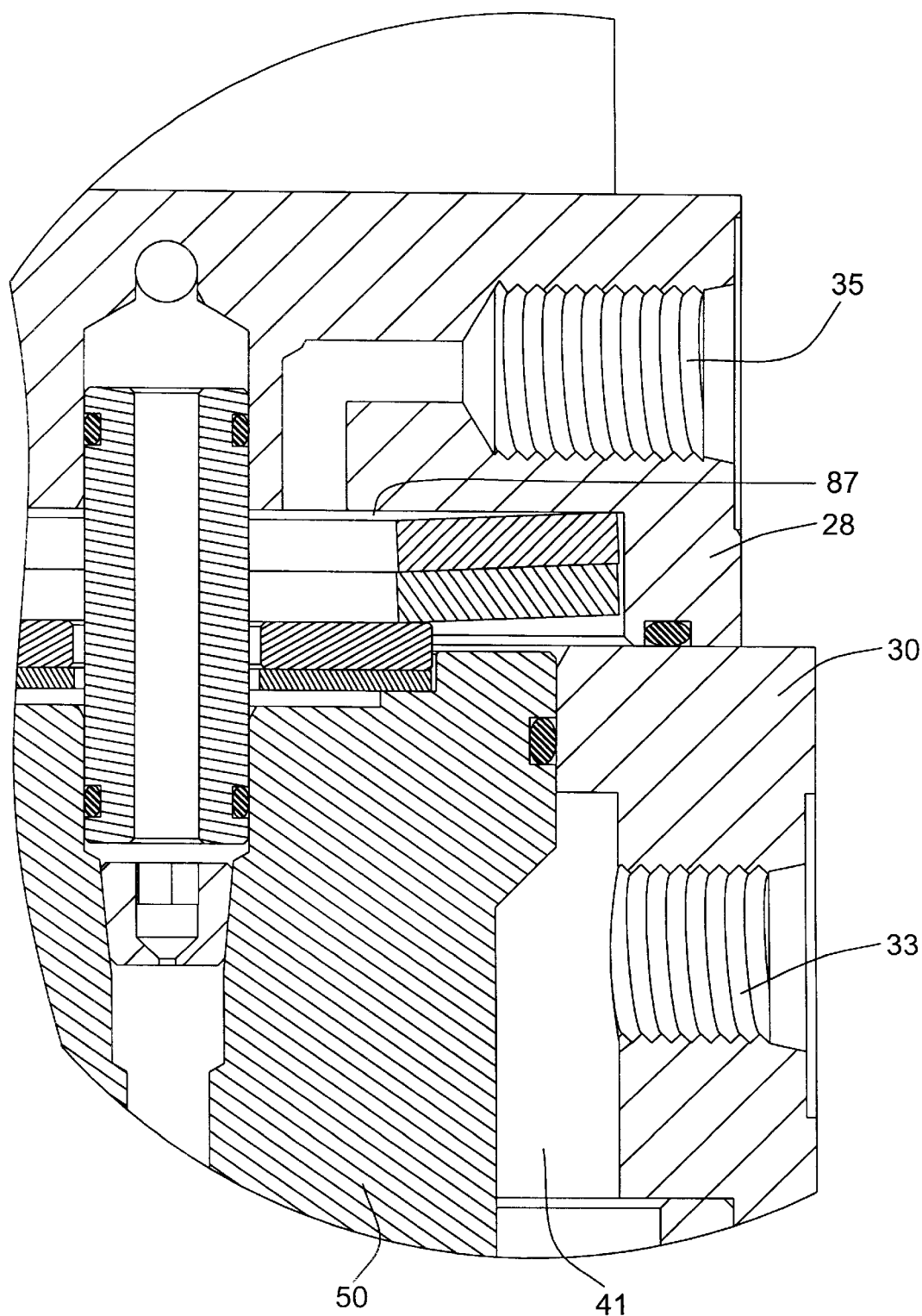
FIG. 5 is an enlarged cross-sectional view of the high pressure fuel injector assembly of FIG. 1 but taken about a different plane to indicate the provision of the gas/oil outlet.

Although electrohydraulic valves are not believed to have been previously applied to the present art, it should be noted that electrohydraulic valves and associated mounting assemblies are generally known in other related fields of art. As such, for purposes of the present invention, the electrohydraulic valve assembly 24 is intended to have a broad meaning and may include an electrohydraulic valve 26, and a mounting block 28 for mounting the electrohydraulic valve 26 to the fuel injector cartridge 22. A mounting flange 30 secures the entire assembly 20 to the engine 121 via conventional fasteners or bolts as shown in FIG. 7. In the preferred embodiment, the electrohydraulic valve 26 includes an electrical driver 23 such as an on/off solenoid and a three-way control valve 25. The three way control valve 25 has a high pressure inlet 27 connected to a pressurized hydraulic supply of oil or other suitable hydraulic fluid and a low pressure outlet 29 connected to a lower pressure sump of oil. In response to external electrical pulses or signals from the electronic engine control, the electrical driver 23 switches the control valve 25 between two positions to successively connect an output 31 alternatively to the high pressure inlet 27 and the low pressure outlet 29. This provides successive hydraulic signals and also alternates the direction of hydraulic flow between the electrohydraulic valve 26 and the fuel injector cartridge 22. As illustrated in FIG. 5, the mounting flange 30 may provide an external gas inlet port 33 for connecting a fuel supply to the inlet of the cartridge and an external gas/oil outlet port 35 for connection to a gas oil separator, the function of which will be described in further detail below.

Many aspects of the present invention are directed toward the fuel injector 22 which is operated by any suitable form of hydraulic signals of a hydraulic type fluid such as oil. Hydraulic actuation provides sufficient force to actuate the valve 46 despite large opposing forces due to the high gaseous fuel pressures, friction, and mechanical spring forces in the cartridge 34. The fuel injector 22 generally includes an outer tubular cartridge housing 32 and an fuel injector cartridge 34 mounted therein. In the preferred embodiment, the cartridge housing 32 includes a hollow and cylindrical body tube 36, a nose piece 38, and a mounting flange 30, all brazed together, and a nozzle 40 press fit into the nose piece 38. Although the nozzle 40 could be integrally provided by the nose piece 38, providing a separate nozzle 40 allows for easy design modifications of the nozzle which can be suited to different sizes or types of engines. The nozzle 40 regulates and optimizes dispersion and mixing of the gaseous fuel in the cylinders of the engine and as such improves environmental emissions and efficiency of the engine. In the preferred embodiment, one end of the cartridge housing 32 is closed by the electrohydraulic valve assembly 24 and the other end of the outer housing 32 is closed by the combination of the nose piece 38 and the end portion of the fuel injector cartridge 34. The cartridge housing 32 contains a gas passageway 41 for communicating gaseous fuel from the gas inlet port 33 to the nozzle 40. In the preferred embodiment, the gas passageway 41 is a large annular chamber between the housing 32 and the cartridge 34. The volume of this chamber (gas passageway 41) is maximized to provide a large local reservoir. This large gas reservoir serves to maintain desirably high gas injection pressure throughout the injection event.

The fuel injector cartridge 34 generally comprises a generally cylindrical cartridge body 42 that houses a cylindrical piston 44 and an elongate valve 46. In the preferred embodiment, the cartridge body 42 is generally of two piece construction, including a lower valve body 48 and an upper actuator body 50 screwed together via interfitting threads or otherwise secured together. The combination of the stationary components, eg. the cartridge body 42 and the outer cartridge housing 32, provide a stationary support housing that provides the gas passageway 41 into the engine cylinder and supports the moving components such as the piston 44 and valve 46. Although it will be appreciated that in alternative embodiments the support housing may be provided by fewer or more components. The actuator body 50 defines a cylindrical bore or control chamber 52 in which the piston 44 is slidably mounted for linear reciprocating movement. The control chamber 52 is connected by a drilled passage 54, connector tube 56, and orifice plug 71 to the output 31 of the electrohydraulic valve 26 for receiving hydraulic operating signals. The end of the drilled passage 54 provides a hydraulic input for receipt of hydraulic signals.

The valve body 48 generally includes a steel body sleeve 58 and upper and lower spaced apart cylindrical collar guides 60, 62. In the preferred embodiment, the upper guide 60 is a solid machined steel member while the lower guide 62 is a self lubricating, high temperature, carbon/graphite bushing formed from a commercially available material. The lower guide 62 is press fit into the sleeve 58. One potential problem with use of carbon/graphite material is fragility and the susceptibility to chipping at the edges. As such, a steel washer or other bushing retainer 63 is seated in a recess in the sleeve 58 below the graphite bushing. The bushing retainer 63 prevents graphite or carbon chips from dropping down and potentially lodging between the valve 46 and valve seat 68. The valve 46 is slidably mounted through axially aligned bores in the guides 60, 62 for linear reciprocating movement between open and closed positions. The guides 60, 62 thus support and guide the linear reciprocating movement of the valve 46. As illustrated, the end portion of the valve body 48 closes one end of the cartridge housing 32. The sleeve 58 defines a frusto-conical valve seat 68 surrounding an outlet orifice 70 that provides for discharge of gaseous fuel into the cylinders of the engine. To ensure correct alignment of the valve seat 68 and the bore of the bottom guide 62, the inner diameter of the conical seat 68 and the inner diameter of the bore in the guide 62 are simultaneously or sequentially precision ground, thereby assuring accurate alignment. This provides precise alignment of the valve with its seat, resulting in long seat life, low gas leakage, and therefore more precise and accurate control over fuel injection. The lower end portion of the valve body 48 also includes cross holes 72 formed in the sleeve 58 and below the lower valve guide 62 to extend the gas passageway 41 to the outlet orifice 70.

Figure 3:
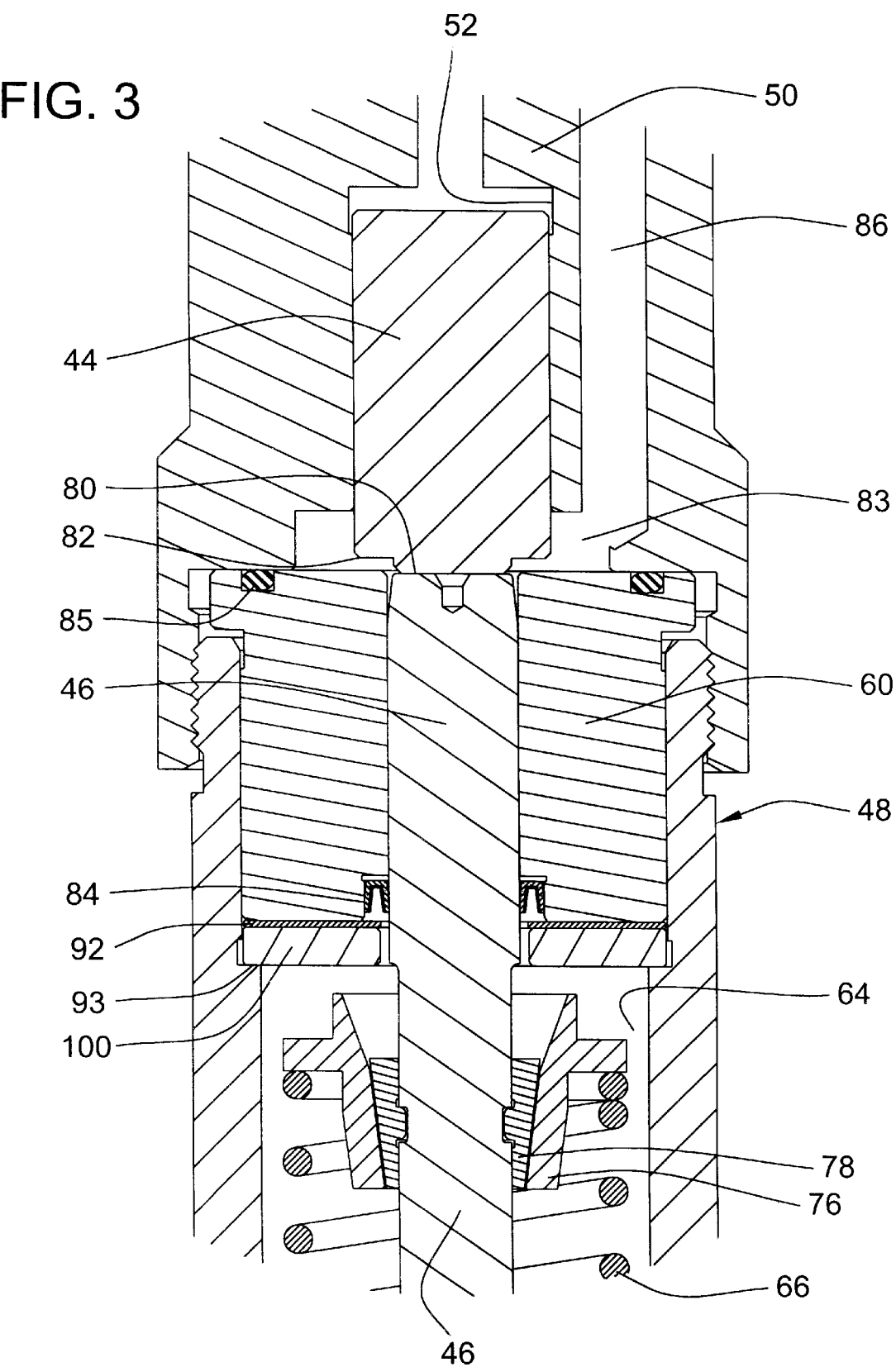
FIG. 3 is an enlarged cross sectional view of a portion of the high pressure fuel injector illustrated in FIG. 1.

A helical compression spring 66 is mounted in a spring chamber 64 between the sleeve 58 and the valve 46 (surrounding the valve 46). The spring 66 biases the valve 46 to a closed position as shown in FIG. 1 in which an enlarged frusto-conical closure member 74 on the valve 46 is seated against the valve seat 68 along a circular contact. Preferably, the respective slope or angles of the mating conical surfaces between the seat 68 and the closure member 74 are offset slightly by a degree or more to ensure tight circular contact which prevents leakage of gaseous fuel into the cylinders of the engine. As shown in FIG. 3, the spring 66 engages a disc shaped spring retainer 76 which is secured to the valve 46 by keepers 78. The spring provides a large force sufficient to prevent the high pressures of the gaseous fuel from causing fuel leakage into the engine's cylinder while the valve is closed. Although the spring 66 could be eliminated if a 4-way actuating valve was provided in the electrohydraulic valve in which the piston would be configured to be hydraulically actuated both ways to both open and closed positions by high pressure hydraulic signals, the spring 66 performs the necessary function of a fail-safe, in that the spring 66 mechanically maintains the valve 46 in the closed position in the event of failure of the electrohydraulic valve or the hydraulic pressure supply.

In the preferred embodiment, the valve 46 is a separate member from the piston 44, but another embodiment of the present invention may integrally provide the two or otherwise connect the two together. These and other possibilities are intended to be covered by all of the claims appended hereto. The piston 44 includes a reduced diameter nose 80 which contacts the top surface of the valve. Surrounding the nose 80 is a seating surface 82 which is adapted to engage the top surface of the upper valve guide 60 acting as a mechanical stop to control the stroke or maximum distance of linear movement of the valve 46, and thereby the fuel injection rate.

Figure 2:
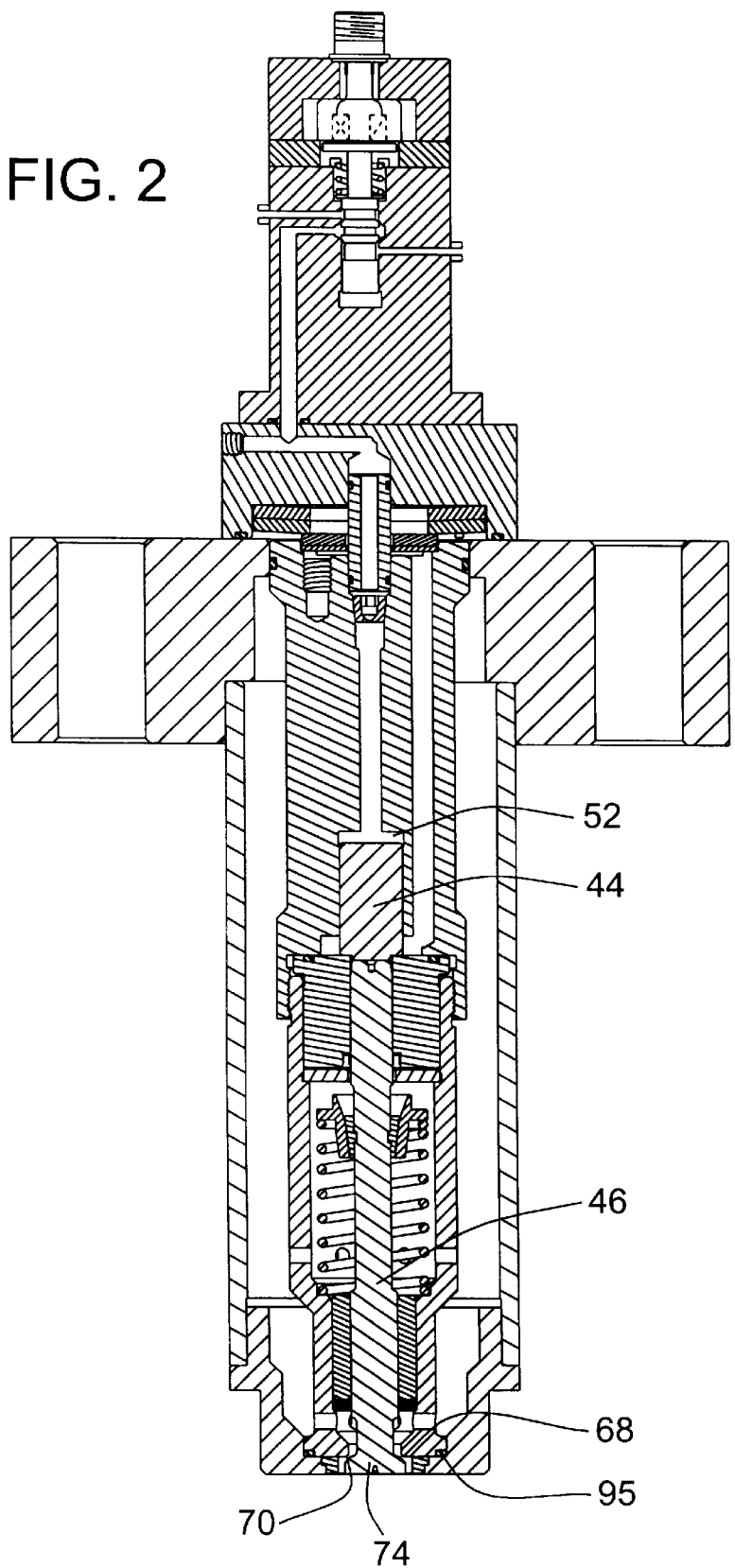
FIG. 2 is a cross-sectional view of a high pressure fuel injector assembly similar to that in FIG. 1 but in an open position.

To open the valve 46, the piston 44 is actuated in response to high pressure hydraulic signals or pulses from the electrohydraulic valve 26. High pressure hydraulic signals result by a connection between the output 31 and the high pressure inlet 27. High pressure hydraulic signals received in the control chamber 52 overpower the force of the spring and linearly actuate the valve 46 to an open position as illustrated in FIG. 2 in which the closure member 74 is lifted off of the valve seat 68 to allow passage of gas through the outlet orifice 70 and into the corresponding cylinder of the engine.

As or after the valve 46 opens, the electrohydraulic valve 26 ends the high pressure hydraulic signal and switches the connection to the output 31 by connecting the output to the lower pressure outlet 29. The spring 66 automatically returns the valve 46 to the closed position, causing hydraulic oil in the control chamber to flow to the lower pressure outlet 29.

The preferred embodiment also includes an orifice plug 71 located in the input passage regulating flow between the electrohydraulic valve 26 and the control chamber 52. It is an advantage that the orifice plug 71 is more restrictive one way and less restrictive the other way, such that the valve 46 moves more quickly from the closed position to the open position than the movement from the open position to the closed position. Because the orifice plug 71 is less restrictive in the direction associated with valve opening, reduced fluid pressure is required to achieve acceptable valve opening velocity. Reduced fluid pressure has the advantage of lower hydraulic power consumption, reduced fluid heating, and less hydraulic system stress. Reduced closing velocity reduces the impact and resulting wear between the valve seat 68 and the closure member each time the valve 46 closes. To accomplish this flow regulation, each side of the orifice plug 71 has a different discharge coefficient. In particular, the plug 71 includes a restriction orifice 73 and a conical or otherwise chamfered surface 75 on one side of the restriction orifice 73 and a substantially flat surface 77 on the other side of the restriction orifice 73. The restriction orifice 73 determines the maximum speed of actuation by limiting hydraulic flow. The chamfered surface 75 directs the pressure of the hydraulic signals like a nozzle and increase the amount of flow through the orifice 73. The substantially flat surface 77 does not direct the flow into the orifice 73 and acts as a barrier thereby reducing the amount of flow through the orifice 73. As a result, the valve 64 moves more quickly towards the open position and more slowly towards the closed position. The force of the spring 66 is also selected to control the return rate.

In accordance with an aspect of the present invention relating to practicality and reliability of the fuel injector 22 and the entire assembly 20, a small controlled amount of hydraulic oil leakage is allowed past the piston 44 for collection in a collection chamber 83 between the actuator body 50 and the valve body 48. In the preferred embodiment, the collection chamber 83 is provided by recesses in the actuator body 50 and mounting block 28. The piston 44 and its mating bore in actuator body 50 are made with hardened, wear resistant surfaces. When lubricated by hydraulic oil, these sliding surfaces exhibit long cyclic life with negligible wear. Conventional sliding seals are commonly known to not provide the required cyclic life and are therefore considered to be not satisfactory for sealing between the piston 44 and its bore. It is therefore an advantage to avoid using sliding seals, and to simply incorporate the lubricated, hardened, steel surfaces. The lubricating oil leakage passing the piston 44 is limited by the small annular clearance between the piston 44 and its mating bore. There are several other advantages of this leakage. One significant advantage it that the leaked hydraulic oil lubricates the sliding movement between metal to metal contact surfaces between the inner bore of the upper guide 60 and the valve 46. This increases wear resistance and significantly prolongs the life of the components in the cartridge 34. Another advantage is that the oil lubricates and prolongs the life of a gas seal 84 between the upper guide 60 and the valve 46. The leaked oil collected in the collection chamber 83 is directed via an outlet in the form of an axial outlet passage 86 in the cartridge body 42 that is connected to the gas/oil outlet port 35 for removal to an external location where gas and oil separation can occur. It should be noted that the leakage is controlled to be a very small flow rate.

The O-ring gasket 85 prevents gas leakage from the gas passageway 41 to the collection chamber 83. The gas seal 84 prevents gaseous fuel leakage between the valve 46 and the upper guide 60. The gas seal 84 is located at the far lower end of the upper guide 60 such that oil lubricates all or substantially all of the contacting surfaces between the upper guide 60 and the valve 46. When initially installed, the gas seal 84 and the O-ring gasket 85 provide zero leakage of gas from the gas passageway 41 (including spring chamber 64) to the collection chamber 83. However, it will be appreciated that over the lifetime of operation (eg. during several hundred million operating cycles) wear can occur, which in turn, may and often causes slow gaseous leakage past the gas seal 84. Indeed, the intense gas pressure exerted by the fuel (eg. typically around 300–700 psig) greatly increases the likelihood of such leakage occurring. The provision of the collection chamber 83 provides a fail safe, tolerates such leakage and vastly extends the operating life for the fuel injector cartridge 34, because small gas leakage is carried away to an acceptable disposal means. If it were not for this gas leakage disposal means, the engine would have to be stopped, and the leaking cartridge replaced, at the first sign of gas leakage past the seals.

A second collection chamber 87 is also provided at the other axial end of the passage 86, generally between the actuator body 50 and the mounting block 28 of the electrohydraulic valve assembly 24. A number of O-ring gaskets 88–91 are provided in this general vicinity and serve to prevent leakage. Two connector tube O-rings 88, 89 between the connector tube 56 and the actuator body 50 and the mounting block 28 of the electrohydraulic valve 26 prevent leakage of oil into the collection chamber 87. However, the continuous and cyclic pulses of hydraulic oil through the connector tube 56 presents a possibility of oil leakage after a long time period. As such, small amounts of oil leakage can be allowed or is tolerated as it is collected in the second collection chamber 87. An O-ring 90 is also provided between the mounting flange 30 and the actuator body 50 to prevent leakage of high pressure gaseous fuel from the gas passageway 41. However, a small amount of gas leakage is also tolerated at this location, in which gas would be collected in the second collection chamber 87 for removal. The outer O-ring 91 prevents leakage of oil and gas to the external environment. It will be appreciated that the oil and any combined oil/gas in the second collection chamber 87 is at relatively low pressure, much lower pressure than either the high pressure gaseous fuel supply or the hydraulic oil at the high pressure inlet 27. As a result, little pressure and thus minimal forces are exerted on this gasket 91 thereby providing a highly reliable seal at this location and avoiding leakage to the external environment.

From the foregoing, it will be appreciated by those skilled in the art that the first and second collection chambers 83, 87 each provide a fail-safe for oil leakage or gas leakage at several locations and two separate means for tolerating leakage of oil and gas at least one location in the fuel injector assembly and for removal of any leakage of hydraulic fluid and gas from the fuel injector assembly.

Figure 4:
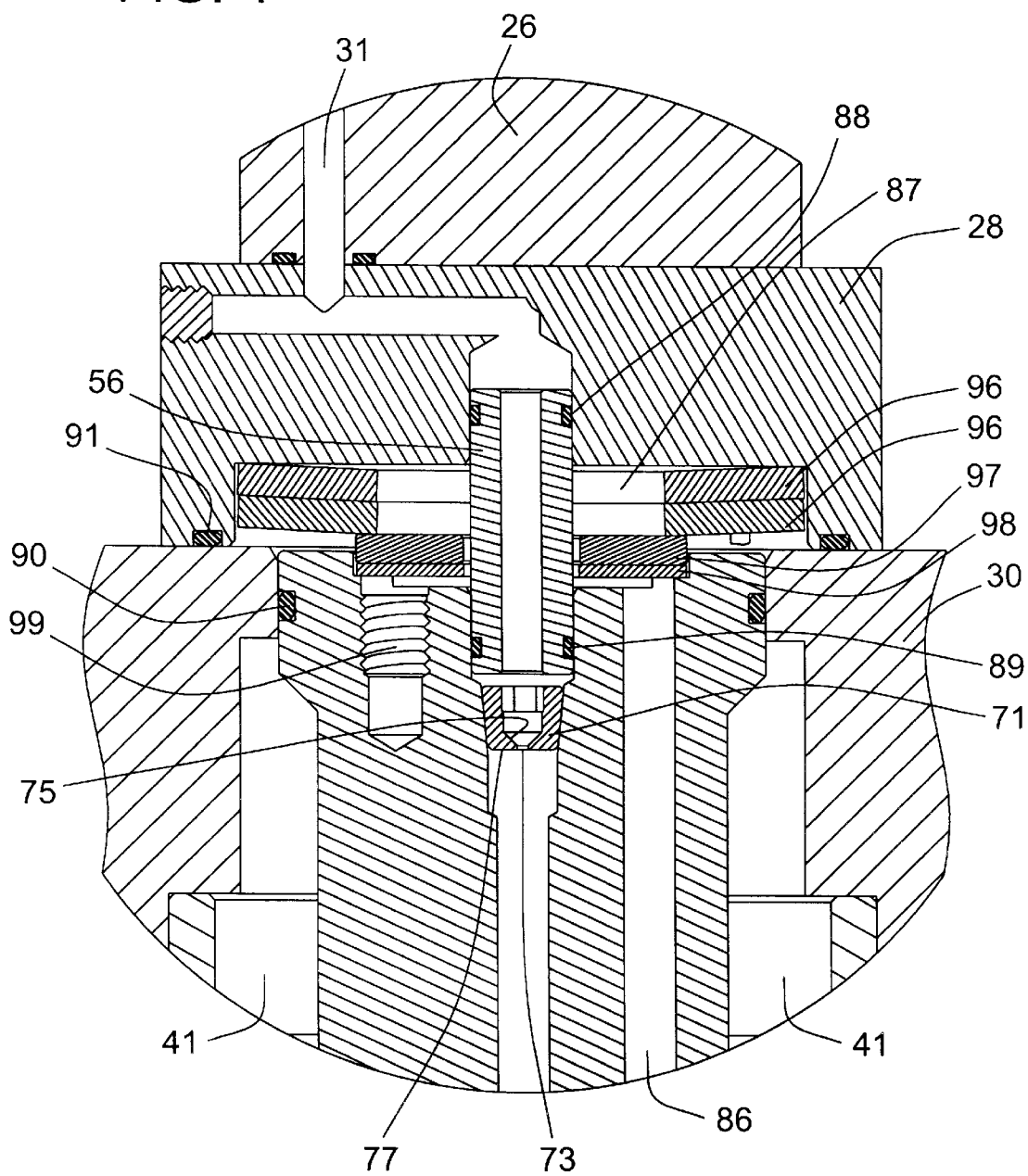
FIG. 4 is an enlarged cross sectional view of another portion of the high pressure fuel injector illustrated in FIG. 1.

In accordance with another aspect of the present invention relating to universality of the valve cartridge 22, a shim 92 is used to control the maximum stroke or distance of reciprocating movement of the valve 46. As shown in FIGS. 1 and 4, the upper guide 60 is compressed axially between the actuator body 50 and a shoulder/recess 93 formed in the valve body sleeve 58. A stop plate 100 and shim 92 are positioned axially between the upper guide 60 and the shoulder/recess to control the amount that the upper guide 60 protrudes from the valve body 48 and the resulting overall axial length of the valve body 48. Excess threads in the two bodies 48, 50 are provided to accommodate variations in their engagements due to different sizes of shims. A thicker shim 92 will increase the protrusion of the upper guide 60 relative to the upper face of the valve 46. As a result, the distance between the outer face of the piston 44 and the face of the upper guide will be reduced, causing the stroke of the valve to be reduced. This in turn results in less gaseous fuel being injected into the cylinders of the engine during each cycle. A thinner shim 92 will increase the allowable stroke of the valve 46, resulting in more gaseous fuel being injected into the cylinders of the engine during each cycle. The selection of the shim 92 thickness allows the valve cartridge 22 to be easily adjusted for larger and smaller types of engines which have different fueling requirements. Thus the preferred embodiment provides a valve cartridge and fuel injector that are universal for a variety of different engines. Using the shim 92, conventional opening distances for the valve closure member 74 of the preferred embodiment can be conveniently adjusted over the range of opening distance range desired for these types of engines. This is an important advantage when considering that the fuel injector 22 is used to retrofit existing engines which exist in a wide variety of models and sizes. Also as shown, the shim 92 and a stop plate 100 axially retain the gas seal 84.

In accordance with another aspect of the present invention relating to cooling and reliability, openings in the form of cross-holes 94 are drilled into the valve body sleeve 58 at radially spaced intervals. The cross-holes 94 allow the cool gaseous fuel entering the gas inlet 33 and flowing through the gas passageway 41 to cool the exposed surface of the valve 46 inside the spring chamber 64. During operation, the nozzle 40 and closure member 74 are exposed to extreme temperatures inside the cylinder of the engine, eg. up to about 2000 degrees Fahrenheit. In contrast, the conventional material of gas seal and other conventional material gaskets and spring materials start to thermally deteriorate at around 300–400 degrees Fahrenheit. By cooling the exposed surface of the valve 46, life of the gaskets/seals and spring and therefore life of the cartridge 34 is prolonged. During operation, the pressure in the gas passageway 41 rises and falls as the valve 46 opens and closes. This in turn causes relatively cool gas to pulsate into and out of the spring chamber vastly enhancing the cooling effect achieved. These cross-holes 94 direct this gas flow towards the valve and spring and improve the life span and reliability of the cartridge 34 by removing heat that would otherwise travel up the valve and spring, undesirably raising the operating temperature of the spring and seals.

Still another function of the cross-holes 94 is to provide a means of restraining the gas valve body 48 while tightening/loosening the threaded joint joining the actuator body 50 and the gas valve body 48. This is accomplished by engaging pins in the cross-holes 94 using a holding fixture designed for that purpose.

Another novel feature of the preferred embodiment is the provision of a metal O-ring 95 for sealing the contacting surfaces between the cartridge housing 32 and the cartridge 34. The metal O-ring provides a highly reliable seal in a location proximate the engine cylinders where the temperatures are extreme. It will be appreciated that current materials for other more conventional types of gaskets would likely fail from thermal damage in this type of environment. To maintain the metal O-ring 95 in sealing relationship, a large axial force, eg. of about 10,000 pounds, is applied by a spring in the form of two Belleville load or spring washers 96 supported by the body of the electrohydraulic valve 26 and engaging the other axial end of the cartridge 34. Specifically, the load washers 96 engage a load pad 97 situated in the second collection chamber 87 and seated in a formed recess in the actuator body 50. Shim 98 is interposed between the load pad 97 and the recess in the actuator body 50. It should be noted that the thickness of the shim 98 is selected to maintain the desired force on the metal O-ring 95. In particular, recalling that the thickness of the shim 92 is variable depending upon the fueling rate requirements of the intended engine, the thickness of the second shim 98 depends upon the thickness of the first shim 92. The thicker the first shim 92, the thinner the second shim 98 is to thereby maintain the same force on the metal O-ring 97. The thickness of second shim 98 is also adjusted to achieve deflection of the load washers as required to generate the desired metal O-ring clamping force, compensating for the effects of manufacturing tolerances in the parts. A threaded hole 99 is also drilled 180 degrees apart from the axial passage 54 to facilitate insertion of screw which can then be used to lift the cartridge 34 out of the housing 32. Together, threaded hole 99 and passage 86, diametrically opposite each other in the face of actuator body 50, conveniently accommodate a common spanner wrench adapter to facilitate tightening/loosening the threaded joint connecting the actuator body 50 and the valve body 48.

Because of the number of moving components and seals, the fuel injector cartridge 34 is intended to have a lifespan of about one to two years. As such, the cartridge 34 is easily replaced by removing the electrohydraulic valve assembly 24, and the various parts between the electrohydraulic valve and the cartridge and pulling the cartridge 34 from the cartridge housing 32. The electrohydraulic valve 26, cartridge housing 32 and interposed parts can be reused with a new replacement fuel injector cartridge 34 and new metal O-ring 95.

Figure 6:
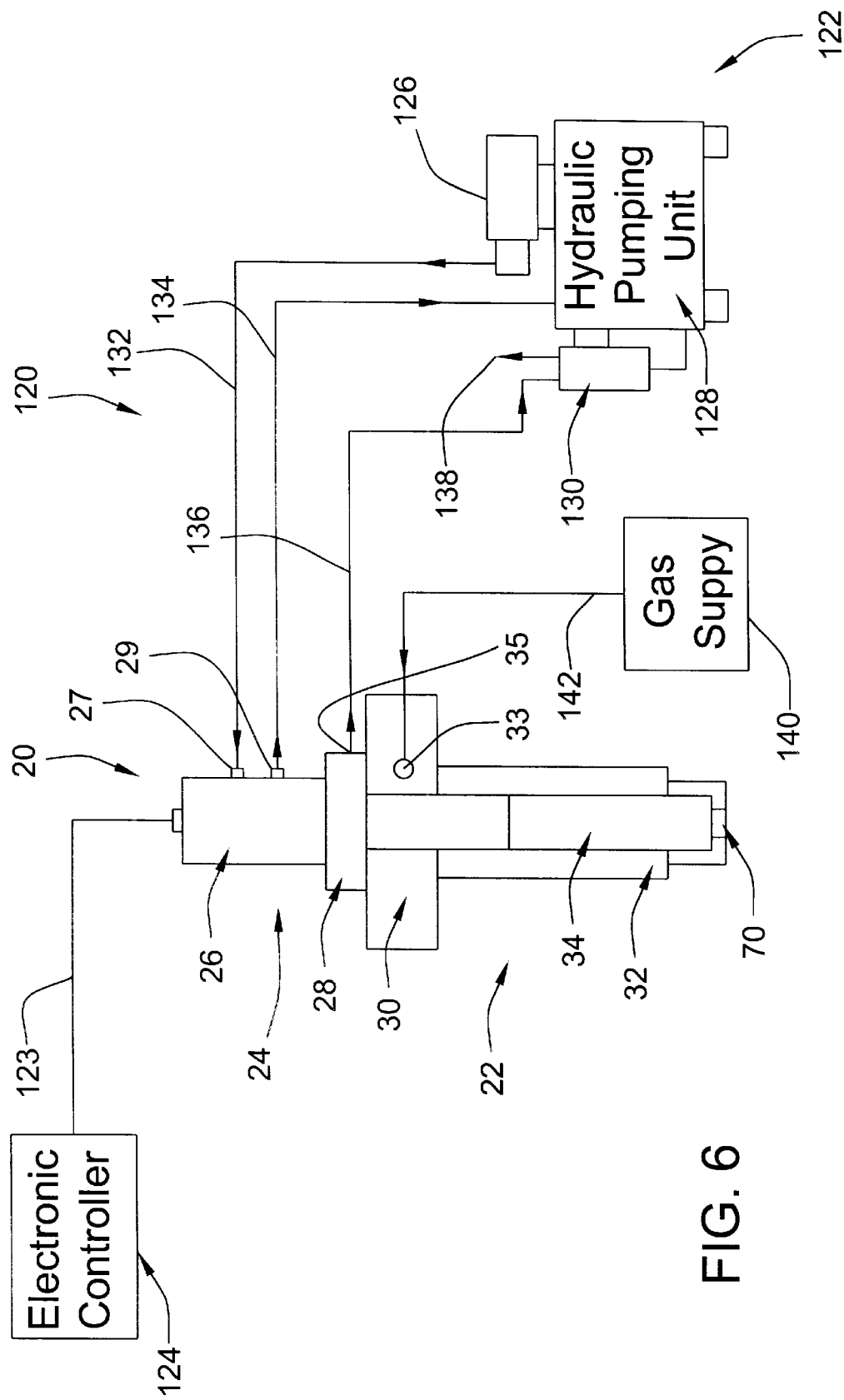
FIG. 6 is a schematic illustration of the high pressure fuel injector assembly of FIG. 1 in an engine system environment.

FIGS. 6 and 7 illustrate one such high pressure fuel injection system 120 incorporating the high pressure fuel injector assembly 20. The primary advantage of this type of system is that the fuel injector 22 injects fuel at high pressures greatly increasing air and fuel mixing in the cylinders and thereby resulting in fewer harmful environmental emissions and increasing engine efficiency. FIG. 6 illustrates the system 120 in schematic form with a single fuel injector valve assembly 20 while FIG. 7 illustrates the system 120 on an engine 121 with multiple valve assemblies 20, one for each cylinder of the engine 121. The system 120 includes a hydraulic pumping unit 122 for supplying high pressure hydraulic oil to the electrohydraulic valve 26 and an electronic controller 124 for driving the electrical driver 23 via electrical signals on electrical line 123. The hydraulic pumping unit 122 in this case is located remote from the engine cylinders and may be electrically or pneumatically powered. The preferred embodiment illustrated in FIG. 7 is an engine driven pump 126, a low pressure sump or reservoir 128, and a gas/oil separator 130. The pump 126 is adapted to pump hydraulic oil from the reservoir 128 to the high pressure inlet 27 of the electrohydraulic valve 26 via a high pressure hydraulic oil supply line 132. The pressure in this line 132 may be in the rough neighborhood of around 800 psig. A low pressure hydraulic return line 134 connects the low pressure outlet 29 with the reservoir 128. This pressure in this line 134 may be in the rough neighborhood of about 45 psig. A gas/oil return line 136 connects the gas/oil outlet port 35 to the gas/oil separator 130. The gas/oil separator 130 allows any combined gas and oil to sit for a sufficient time at which the gas separates and is exhausted via a gas vent 138 to a non-explosive location. A gaseous fuel supply 140 of a combustible gas is connected to the gas inlet 33 by a gas line 142 that may have a pressure in the neighborhood of between about 300–700 psig, or other suitable lower or higher pressure. Other associated equipment includes a hydraulic oil filter 144 for keeping the hydraulic oil clean and a gas leakage indicator 146 for sensing excessive gas leakage which could indicate hazardous conditions.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A fuel injector for injecting gaseous fuel into a cylinder of an engine, the fuel injector adapted to be driven by hydraulic signals of a hydraulic fluid, comprising:
   a support housing having a gas passageway therein for communicating gaseous fuel to the cylinder of the engine;
   a piston mounted in a piston control chamber actuated by the hydraulic signals;
   a valve in the housing driven by the piston between open and closed positions corresponding with opening and closing the gas passageway to the cylinder of the engine;
   a collection chamber in the support housing, hydraulic fluid adapted to leak past the piston into the collection chamber, leaked oil being communicated to an outlet for removal;
   wherein the piston is mounted in the control chamber without seals, with a small clearance between the piston and the control chamber, a controlled amount of hydraulic fluid adapted to continuously leak past the piston; and
   a gas seal between the valve and the support housing, the gas seal engaging the valve for preventing gaseous fuel from leaking from the gas passageway into the collection chamber, wherein the collection chamber provides a fail safe in which gas leakage past the gas seal is tolerated, any gas leakage being joined with leaked hydraulic fluid for removal and separation via the outlet.

2. The fuel injector of claim 1 further comprising a spring in the support housing biasing the valve to the closed position, wherein hydraulic fluid flows one way into the support housing to open the valve and the opposite way out of the support housing to close the valve.

3. The fuel injector of claim 2 further comprising means for regulating flow between the hydraulic input and the control chamber, said regulating means being more restrictive one way and less restrictive the other way, wherein the valve moves more quickly from the closed position to the open position than the movement from the open position to the closed position.

4. The fuel injector of claim 3 wherein the restricting means is an orifice plug, the plug including a restriction orifice, the plug having a chamfered surface on one side of the restriction orifice and a substantially flat surface on the other side of the restriction orifice.

5. The fuel injector of claim 1, further comprising a second collection chamber at the end of the housing, said first collection chamber being connected to the second collection chamber by an outlet passage, further comprising a seal being located at the outer periphery of the valve housing to prevent gaseous fuel from leaking into the second collection chamber, the second collection chamber acting as a fail safe for gaseous fuel leakage past the seal.

6. The fuel injector of claim 1 wherein the support housing includes a tubular cartridge housing and a cartridge body inserted therein, the cartridge housing having an end closed by cartridge body, the cartridge body including an actuator body and a valve body secured together, the actuator body defining a control chamber in which the piston is slidable, the valve body guiding linear movement of a valve, the piston being a separate component from the valve and not connected therewith contacting each other along a contact surface, the valve body defining an outlet orifice in communication with the gas passageway and a valve seat surrounding the outlet orifice, the valve having a closure member adapted to open and close the valve seat.

7. A high pressure fuel injector assembly for injecting high pressure gaseous fuel into a cylinder of an engine, comprising:
   an electrohydraulic valve assembly including an electrical driver and a control valve, the control valve having a high pressure hydraulic inlet, a low pressure outlet, and an output, the electrical driver switching the control valve between two positions including a first position connecting the output with the high pressure inlet and a second position connecting the output with the low pressure outlet;
   a fuel injector mounted to the electrohydraulic control assembly, the fuel injector including a support housing, and a piston actuated valve inside of the support housing, the support housing having a gaseous fuel passageway therethrough communicating high pressure gaseous fuel to the engine, the piston actuated valve adapted to sequentially open and close the fuel passageway to the engine in response to the output; and
   means for tolerating leakage of oil and leakage of gas at least one location in the fuel injector assembly and for removing any leakage of hydraulic fluid and gas from the fuel injector assembly.

8. The high pressure fuel injector assembly of claim 7 wherein the tolerating and removing means comprises a collection chamber between the piston and the valve of the piston actuated valve, hydraulic fluid adapted to leak from the control chamber past the piston and into the collection chamber, leakage of any gaseous fuel from the gaseous fuel passageway past the piston actuated valve and into the collection chamber being tolerable.

9. The high pressure fuel injector assembly of claim 8 further comprising a gas seal between the piston actuated valve and the support housing for preventing gas leakage from the gas passageway to the collection chamber, the gas seal providing said at least one location.

10. The high pressure fuel injector assembly of claim 7 wherein the tolerating means comprises a collection chamber between the electrohydraulic valve assembly and the fuel injector, the collection chamber providing a fail safe for any gaseous fuel leakage and oil leakage between the electrohydraulic valve assembly and the fuel injector.

11. The high pressure fuel injector assembly of claim 10 wherein the at least one location includes a first O-ring gasket between the electrohydraulic valve assembly and the support housing, arranged to prevent gas leakage from the gas passageway to the collection chamber.

12. The high pressure fuel injector assembly of claim 11 further comprising a second O-ring gasket between the support housing and the electrohydraulic valve assembly, the second O-ring gasket arranged to prevent any leakage of oil and gas from the collection chamber to the external environment.

13. The high pressure fuel injector assembly of claim 11 further comprising a connector tube extending through the collection chamber connecting the hydraulic output of the control valve with a hydraulic input of the support housing, and two additional O-ring gaskets, one providing a seal between the electrohydraulic valve and the connector tube, and the other providing a seal between the support housing and the connector tube, the collection chamber providing a fail safe for the two additional O-ring gaskets.

14. The high pressure fuel injector assembly of claim 7 further comprising:

a spring biasing the valve to the closed position; and means for regulating flow between the electrohydraulic valve assembly and the fuel injector, said regulating means being more restrictive to flow in one direction and less restrictive to flow in the other direction, wherein the piston actuated valve moves more quickly from the closed position to the open position than the movement from the open position to the closed position.

15. A high pressure fuel injector assembly for injecting high pressure gaseous fuel into a cylinder of an engine, comprising:

an electrohydraulic valve assembly providing an output for actuating the high pressure fuel injector assembly;

a fuel injector mounted to the electrohydraulic control assembly, the fuel injector including a support housing, and a piston actuated valve inside of the support housing, the support housing having a gaseous fuel passageway therethrough communicating high pressure gaseous fuel to the engine, the piston actuated valve adapted to sequentially open and close the fuel passageway to the engine in response to the output; and means for tolerating leakage of oil and leakage of gas at least one location in the fuel injector assembly and for removing any leakage of hydraulic fluid and gas from the fuel injector assembly.

16. The high pressure fuel injector assembly of claims 15 wherein the tolerating and removing means comprises a collection chamber between the piston and the valve of the piston actuated valve, hydraulic fluid adapted to leak from the control chamber past the piston and into the collection chamber, leakage of any gaseous fuel from the gaseous fuel passageway past the piston actuated valve and into the collection chamber being tolerable.

17. The high pressure fuel injector assembly of claim 16 further comprising a gas seal between the piston actuated valve and the support housing for preventing gas leakage from the gas passageway to the collection chamber, the gas seal providing said at least one location.

18. The high pressure fuel injector assembly of claim 15 wherein the tolerating means comprises a collection chamber between the electrohydraulic valve assembly and the fuel injector, the collection chamber providing a fail safe for any gaseous fuel leakage and oil leakage between the electrohydraulic valve assembly and the fuel injector.

19. The high pressure fuel injector assembly of claim 18 wherein the at least one location includes a first O-ring gasket between the electrohydraulic valve assembly and the support housing, arranged to prevent gas leakage from the gas passageway to the collection chamber.

20. The high pressure fuel injector assembly of claim 19 further comprising a second O-ring gasket between the support housing and the electrohydraulic valve assembly, the second O-ring gasket arranged to prevent any leakage of oil and gas from the collection chamber to the external environment.

* * * * *

UNITED STATES PATENT AND TRADEMARK OFFICE
CERTIFICATE OF CORRECTION

PATENT NO. : 6,409,096 B2
DATED : June 25, 2002
INVENTOR(S) : Roger C. Popp

It is certified that error appears in the above-identified patent and that said Letters Patent is hereby corrected as shown below:

Column 13,
Line 27, change "claims" to -- claim --.

Signed and Sealed this

Twentieth Day of August, 2002

Attest:

Attesting Officer

JAMES E. ROGAN
Director of the United States Patent and Trademark Office